(12) United States Patent
Knight et al.

(10) Patent No.: US 7,761,602 B1
(45) Date of Patent: Jul. 20, 2010

(54) PLAYBACK OF CONTENT ON PORTABLE DEVICES

(75) Inventors: David Knight, San Jose, CA (US); Pruthvish Shankarappa, Davis, CA (US)

(73) Assignee: Adobe Systems Incorporated, San Jose, CA (US)

( * ) Notice: Subject to any disclaimer, the term of this patent is extended or adjusted under 35 U.S.C. 154(b) by 178 days.

(21) Appl. No.: 11/945,251

(22) Filed: Nov. 26, 2007

(51) Int. Cl.
*G06F 15/16* (2006.01)

(52) U.S. Cl. ...................... 709/246; 709/209

(58) Field of Classification Search .......... 709/246, 709/209
See application file for complete search history.

(56) References Cited

U.S. PATENT DOCUMENTS

| | | | | |
|---|---|---|---|---|
| 7,136,934 | B2 * | 11/2006 | Carter et al. | 709/248 |
| 7,281,214 | B2 * | 10/2007 | Fadell | 715/745 |
| 2002/0194309 | A1 * | 12/2002 | Carter et al. | 709/219 |
| 2003/0079038 | A1 * | 4/2003 | Robbin et al. | 709/232 |
| 2004/0155897 | A1 * | 8/2004 | Schwartz et al. | 345/716 |
| 2006/0168351 | A1 * | 7/2006 | Ng et al. | 709/248 |
| 2007/0033295 | A1 * | 2/2007 | Marriott | 709/248 |
| 2007/0130331 | A1 | 6/2007 | Kao et al. | |
| 2007/0169087 | A1 * | 7/2007 | Fadell | 717/168 |
| 2008/0086494 | A1 * | 4/2008 | Heller et al. | 707/102 |
| 2008/0201375 | A1 * | 8/2008 | Khedouri et al. | 707/104.1 |
| 2009/0125571 | A1 * | 5/2009 | Kiilerich et al. | 707/204 |

OTHER PUBLICATIONS

Chanda, "Embedded Document within an Application", Pending U.S. Appl. No. 11/567,111, filed Dec. 5, 2006, 24 pages.
Hosmer, et al., "System and Method for Developing Information for a Wireless Information System", Pending U.S. Appl. No. 10/791,299, filed Mar. 1, 2004, 26 pages.
Morris, et al., "Mobile Rich Media Information System", Pending U.S. Appl. No. 10/791,298, filed Mar. 1, 2004, 43 pages.
Qualcomm Incorporated, "Binary Runtime Environment for Wireless", May 8, 2003, 43 pages.
Rodgers, et al. "Bandwidth Management System", Pending U.S. Appl. No. 10/791,311, filed Mar. 1, 2004, 27 pages.

* cited by examiner

*Primary Examiner*—Vivek Srivastava
*Assistant Examiner*—Thomas Duong
(74) *Attorney, Agent, or Firm*—Fish & Richardson P.C.

(57) ABSTRACT

A computer-implemented method includes identifying encoded content to be presented. The method also includes loading the content into a content player. The content player is configured to dynamically identify a local decoder that is operable to decode the content. The method further includes providing the identified content to the local decoder during playback of the content; and presenting the decoded content.

25 Claims, 3 Drawing Sheets

PLAYBACK OF CONTENT ON PORTABLE DEVICES

BACKGROUND

Users of portable devices, such as cellular phones, media players, electronic games personal data assistants (PDAs), and "smart phones" increasingly demand a media rich environment on their portable devices. Users may register with a wireless service provider to receive various types of content from the service provider on their portable devices. Some portable devices may be connected to networks such as the Internet and may receive content directly from various web sites and third party content providers. The content, which includes graphics, video, animation, audio, text, and the like, may be delivered to a portable device at the request of the service provider or the user.

SUMMARY

This specification describes technologies relating to playback of content on portable devices in mobile information systems.

In general, one aspect of the subject matter described in this specification can be embodied in a method that includes identifying encoded content to be presented. The method also includes loading the content into a content player. The content player is configured to dynamically identify a local decoder that is operable to decode the content. The method further includes providing the identified content to the local decoder during playback of the content; and presenting the decoded content. Other embodiments of this aspect include corresponding systems, apparatus, and computer program products.

In general, another aspect of the subject matter described in this specification can be embodied in a device that includes a network interface, a portable content player, memory storing content, a playback engine, and a porting layer through which the content player interfaces with the device. The playback engine is operable to playback the content using a decoder.

In general, another aspect of the subject matter described in this specification can be embodied in a system that includes a network. The system also includes a server communicatively coupled to the network operable to transmit content through the network. The system further includes a portable device communicatively coupled to the network. The portable device is operable to receive the content. The portable device is also operable to load the content into a content player. The content player is configured to dynamically identify a local decoder that is operable to decode the content. The portable device is further operable to provide the identified content to the local decoder during playback of the content; and present the decoded content.

These and other embodiments can optionally include one or more of the following features. The local decoder can be provided in a platform of a portable device. The content can include audio content and the local decoder can include an audio decoder. The content can include video content and the local decoder can include a video decoder. The content can be stored in an automatically synchronizing data store. The data store can receive the content from one or more networks based on an update frequency of the content. The content player can include a virtual machine. The content player can include a playback engine. The virtual machine can be operable to send requests to decode the content to the playback engine. The playback engine can dynamically select a local decoder. The content player can include a software package installed on a portable device. The portable device can include an operating system. The content player can be operable to interface with the operating system to identify the local decoder.

Particular embodiments of the subject matter described in this specification can be implemented to realize one or more of the following advantages. A manufacturer who makes both portable devices with hardware decoders and without hardware decoders may install a single configuration of a content player. The content player may use the device's playback capabilities when present, or may use the content player's software decoding when such capabilities are not available on the device. By not compiling in the software decoding with the content player, the content player can make the determination as to which decoder to use at run-time. Portable device memory may be conserved by not including a content player decoder in devices that have hardware and/or software decoders in the OS. In some embodiments, manufacturers may change decoders as they become popular or required for business goals. Third parties may also create optimized software decoders, possibly reducing the overall development costs of a device. Problems with decoders may be rectified and other optimizations may be applied without modifying the hardware of the device. For example, the content player's decoding may be used instead of the device playback capabilities.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Content may be in the form of any combination of text, images, audio, vector graphics, bitmaps, frame-based animation, video, and any other format that may be communicated over a network or stored on a portable device. Portions or all of content may be encoded. Content may include or be embedded in executable scripts or other sequences of instructions. Other types of content are possible. Depending on the format of the content, an application, such as a media player or other run-time component, running on a portable device may be invoked to execute a script or instructions, or to otherwise display the content.

Figure 1:
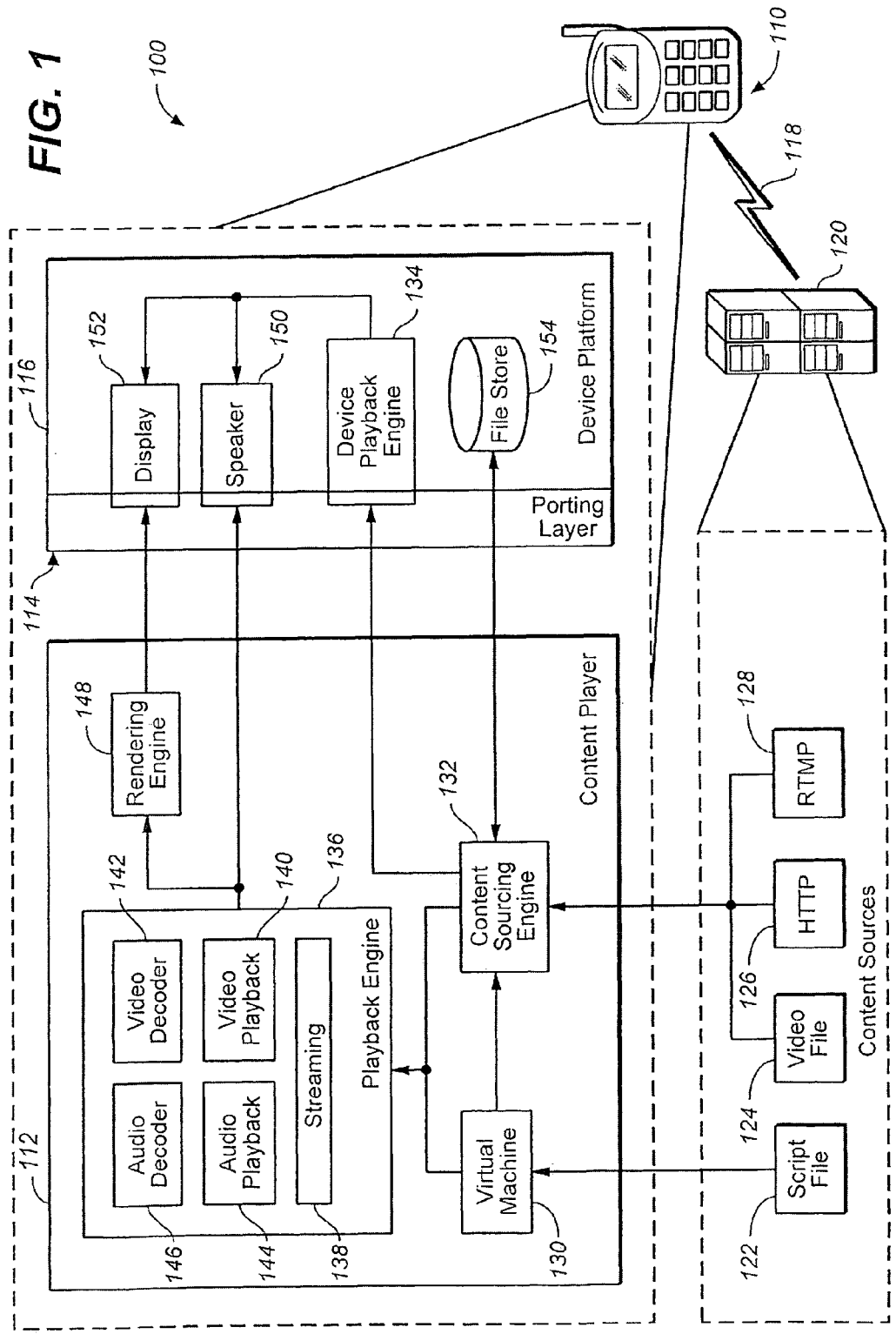
FIG. 1 is an illustration of an example system for dynamic playback of content on portable devices.

FIG. 1 illustrates an example system 100 for dynamic playback of content on portable devices. System 100 generally includes a portable device 110 and servers 120 connected through a network 118. The portable device 110 may include a content player 112, a porting layer 114, and device platform 116, which includes an operating system ("OS") and hardware. Either or both the content player 112 and the device platform 116 may have a playback engine, such as playback engine 136 for the content player 112 and playback engine 134 for the device platform 116. In general, content may be loaded into the content player 112 for playback. The content player 112 may identify a local decoder to use for decoding the content. The device 110 may include its own native decoder that may be hardware, software, or a combination of both that is optimized to the device. If such a device decoder exists, the content player 112 may use the device decoder, otherwise the content player 112 may use its own or a third party software decoder. Identifying a local decoder may be performed dynamically at run-time. An advantage of some embodiments is that a manufacturer who makes both devices with decoding capabilities and devices without decoding capabilities may install a single configuration of a content player 112 on both types of devices allowing the content player 112 to take advantage of the device playback capabilities when present. Memory of portable device 110 may be conserved by not including a decoder with the content player 112 in devices 110 that have hardware and/or software decoders in the OS. In some embodiments, manufacturers may change decoders as they become popular or required for business goals. Third parties may also create optimized software decoders, possibly reducing the overall development costs of a device. Problems with decoders may be rectified and other optimizations may be applied without modifying the hardware of the device. For example, the content player's decoding may be used instead of the device playback capabilities. Various embodiments may have none, some, or all of these advantages.

The portable device 110 may be a mobile phone (e.g., a cellular telephone), smart phone, personal digital assistant (PDA), Blackberry device, laptop computer, Pocket PC, electronic gaming device, media player, personal computer, workstation, server or combinations of the like or other types of similar devices. The device 110 may include output devices such as a video display 152, which may be touch sensitive and integrated with or separate from the device 110, and integrated or separate speakers 150 for audio reproduction. The device 110 may also include user input devices such as buttons, a keypad, a mouse or joystick, a microphone, a camera, and sensors such as one or more accelerometers for determining the orientation of the device 110.

A device 110 may include a device platform 116, which may include hardware, an operating system, and any other software that may be used to operate the device 110. Hardware may include decoders, memory, processors, display 152, and speaker 150. The operating systems that may be included in a device platform 116 vary widely. To name a few, example operating systems include Symbian OS, Palm OS, Windows Mobile, RIM BlackBerryOS, Mac OS X, and Linux. The device platform 116 may include an audio and/or video decoder that is accessible through the porting layer 114 to provide decoding functionality to applications running on the device 110.

The memory of the device 110 may also include a file store 154 that may store content as well as data specific to a user of the device 110, such as call logs, user preferences, and telephone directories. The file store 154 may also include an automatically synchronizing data store that receives updated content from a server 120 based on a frequency associated with the content or other factors.

The device platform 116 may be connected to a content player 112 that is used to manage and playback content. The content player 112 may support vector graphics, bitmaps, and frame-based animation, as well as text input and dynamic text. The content player 112 may be able to process files, such as SWF files, which may include native device fonts or embed arbitrary fonts. SWF file provides an executable, compact, tag-based, easily extendible format that supports streaming, bitmap and vector graphics, and scripting, and may be executed by applications, such as Adobe® Flash® Player available from Adobe Systems Incorporated. SWF files may contain embedded content that may be presented by the content player 112. The content player 112 may also support scripting integration with portable device 110 capabilities, including keypad navigation, button presses, notification, messaging, and media playback, as well as integration with the general operating system functionality of portable device 110.

The content player 112 may include any combination of components. Each component may be assigned a unique identifier and may register with the content player 112. At run-time, the content player 112 may access a registered component as needed to facilitate the playback of content. Generally, the components may include, but are not limited to a virtual machine 130, a content sourcing engine 132, a playback engine 136, and a rendering engine 148. The playback engine 136 may include a streaming engine 138, video and audio playback engines 140 and 144, video and audio decoders 142 and 146.

The content player 112 may include a virtual machine 130, such as the Adobe®Flash® Player (i.e., a virtual machine capable of executing ActionScript™), a Java Virtual Machine, the Common Language Runtime (available from Microsoft Corporation), or some other virtual machine or module capable of executing instructions or script files. The virtual machine 130, when executing instructions, may encounter a tag or other indicator that refers encoded video or other rich media. The virtual machine 130 may forward the encoded content to the content sourcing engine 132 for playback.

The content sourcing engine 132 may manage the inputting of content and may determine whether the content is handled mainly by the content player 112 or the device platform 116. The content sourcing engine may communicate with the file store 154 to store and/or retrieve content. A content sourcing engine 132 may receive content from a variety of sources, which include, but are not limited to: content embedded in a script file 122 received through the virtual machine 130; content stored in one or more files 124 that are downloaded from a server 120 or stored in file store 154; content from a server 120 received over the internet via an hypertext transfer protocol ("HTTP"); and content from a server 120 received over the internet via a proprietary protocol, such as Real-Time Messaging Protocol ("RTMP") from Adobe Systems Incorporated. The script file 122 may be a SWF file or any file containing instructions that may be executed. At run-time, the content sourcing engine 132 may determine whether the device platform 116 has content playback capabilities. If so, the content may be forwarded to the device streaming and playback engine 134; otherwise, the content may be forwarded to the content player playback engine 136.

The playback engines 134 and 136 each take as input content received from the sourcing engine 132 and reproduce or present the content on the display 152 and/or speaker 150. The content player playback engine 136 may include a streaming engine 138, a video playback engine 140, an audio playback engine 144, a video decoder 142, and an audio decoder 146. None, some, or all of these components may not be included with the content player playback engine 136. The streaming engine 138 may function as a gatekeeper or traffic director for video frame decoding. The streaming engine 138 may use audio stream time to throttle the video frame decode rate. Streaming engine 138 may also include logic to skip video frames in order to sync video and audio content, to enable seeking within the video, to buffer video and audio, to request a decoder to turn on/off the post processing filters, and other logic that facilitates the presenting of content. The streaming engine 138 may also separate audio and video content and feed them to the appropriate playback engine. The streaming engine 138 may also perform operations such as dropping video frames, optimizing frame transitions (e.g., blending video frames), throttling/buffering of networking and data stream information, color and scaling transformations, deblocking and smoothing, and several other operations. The audio playback engine 146 may receive encoded audio from the sourcing engine 132 and/or the virtual machine 130; decode each audio stream; mix the various audio streams into a single channel; and output the result to the speaker 150. The video playback engine 140 may receive encoded video frames and images from the content sourcing engine 132 and/or the virtual machine 130; decode the content; and output the decoded content to the rendering engine 148. The rendering engine 148 may combine the layers of images of a frame into a single image. The result may be output to the display 152.

The audio playback engine 144 may utilize the audio decoder 146, which may be implemented independent of the device platform 116, or may utilize, via the porting layer 114, an audio decoder provided in the device platform 116, if one exists. The determination and selection of which audio decoder to use may be made dynamically, at run-time. Similarly the video playback engine 140 may utilize the video decoder 142 of the content player 112 or may utilize the video decoding capabilities of the device 110, if the device 110 has such capabilities. A decoder that has been registered with the content player 112 may be selected. Registering may occur when the content player 112 is instantiated on the device 110. Multiple audio decoders and multiple video decoders may be locally available at run-time. The selection among them may be determined using a pre-configured priority list. For example, if at run-time, a device hardware video decoder is available then it may be used over other video decoders. If no device hardware video decoder exists, then a device software video decoder may have priority over other video decoders. If the no device hardware or software decoder is available, the video decoder of the content player 112 may be used. The audio and video playback engines 144 and 140 may operate independently of one another, such that an audio decoder of the device platform 116 may be used to decode audio content and the video decoder 142 of the content player 112 may be used to decode video content. A decoder may also be selected on the basis of playback quality, playback speed, licensing restrictions, user preferences, and a host of other criteria.

The video decoder 142 may receive video encoded in any one of a variety of colorspaces (e.g., YCbCr, RGB, Luv, Lab, etc.) and may decode and convert the video to another of a variety of colorspaces (e.g., YCbCr, RGB, Luv, Lab, etc.) for playback. The video decoder 142 may also scale, filter, and smooth images to meet the output of the device 110.

The device playback engine 134 may be implemented in hardware and/or software by the manufacturer of the device 110. The device playback engine 134 may perform any combination of functions analogous to those performed by the various blocks of the content player playback engine 136, described above.

The content player 112 may communicate with the device platform 116 through a porting layer 114. The porting layer 114 may contain software methods and functions that have been implemented according to one or more application programming interfaces ("APIs"), as described in FIG. 2 (at 204) and its description below. Although the interface for the methods of the porting layer may be the same, the actual implementation of each method may vary according to the device platform 116.

The network 118 enables communications between the portable device 110 and servers 120. Portions of network 118 may communicate with or include a cellular network, a wireless and/or wired personal, local, metropolitan, regional and/or wide area networks, and/or the Internet. Wireless and cellular networks may communicate using a variety of standards and/or protocols, including, for example, Institute of Electrical and Electronics Engineers (IEEE) 802.11 related standards, IEEE 802.16 related standards, Wideband Code Division Multiple Access (W-CDMA), High-Speed Downlink Packet Access (HSDPA), Enhanced Data Rates for GSM Evolution (EDGE), General Packet Radio Services (GPRS) and Global System for Mobile Communication (GSM). Portions of network 118 may be administered by a wireless service provider, such as T-Mobile®, Verizon Wireless®, or Sprint Nextel®, for example. Subscribers to the wireless service may receive external content from content providers through portable device 110. The network 118 may communicate with the Internet and may facilitate communications between portable device 110 and Internet websites and any content available through the Internet.

Servers 120 may include clusters of feed servers and data source servers. The client-server architecture of system 100 may use clustering technology to help ensure performance, reliability, and scalability while minimizing deployment complexities through a flexible integration framework. Servers 120 may aggregate content from external content providers received over the Internet and organize the content into downloaded or streamed files that may be transmitted to the content player 112 on device 110 over network 118. Servers 120 may filter content files based on user preferences, portable device 110 types, portable device 110 capabilities, access controls, and local legal or other restrictions (e.g., decency and privacy laws). Servers 120 that are data source servers may retrieve, normalize, and aggregate content from the web servers of content providers, may transform various formats of retrieved content, for example, into a common XML format, and may pass the content on to servers 120 that are feed servers for delivery to the content player 112. Retrievals and/or transmissions may be scheduled at predetermined intervals, at which times differential updates may be collected. Transmissions may also be pushed from the feed server to the device whenever new content becomes available. Data source servers 120 may be configured to handle content feeds in various formats (e.g., RSS, Atom, XML, etc.). Content files may support embedded content types including, for example, text, images, and SWF files.

In operation, a server 120 may transmit content over a network 118 to a device 110. The content may be embedded in a script file 122, and may be received by the virtual machine 130. The content may also be included in one or more video files 124 stored in file store 154. The content sourcing engine 132 may receive and may determine the playback engine to which to forward the content. The device playback engine 134 may receive the content if the device 110 has native playback capabilities and the playback engine 134 is registered with the content player 112. Otherwise the playback engine 136 of the content player 112 may be responsible for playing the content. Where the device 110 handles the content, the device 110 may decode any encoded content and render any images or video directly onto the display 152 and audio directly to speaker 150. Upon forwarding the content to the device playback engine 136, the content player 112 may provide an alpha value that is used to control the transparency of the images rendered on the display such that animations or other content displayed by the content player 112 may not be overridden.

Where the device 110 lacks full playback capabilities, the content player 112 may handle the content. In that case, the content sourcing engine 132 may forward the content to the playback engine 136. The streaming engine 138 may receive the content and perform any buffering that may be needed. The streaming engine 138 may then split the audio and video content. The audio content may be decoded by audio decoder 146 and mixed with audio from other sources, such as those embedded in instructions executed by the virtual machine 130. In a similar fashion, video may decoded by video decoder 142 and forwarded to a rendering engine 148, which may combine the decoded video with images and/or video from other sources before displaying the result on display 152.

The device 110 may provide partial playback capabilities, such as providing a video decoder that may be accessed through the porting layer 114. In such cases, the playback engine 136 of the content player 112 may use the device video decoder instead of the video decoder 142 in content player 112. The determination of whether the device provides a decoder may be done at run-time and may depend on whether the device decoder is registered with the content player 112 at the time that a video requires decoding.

Figure 2:
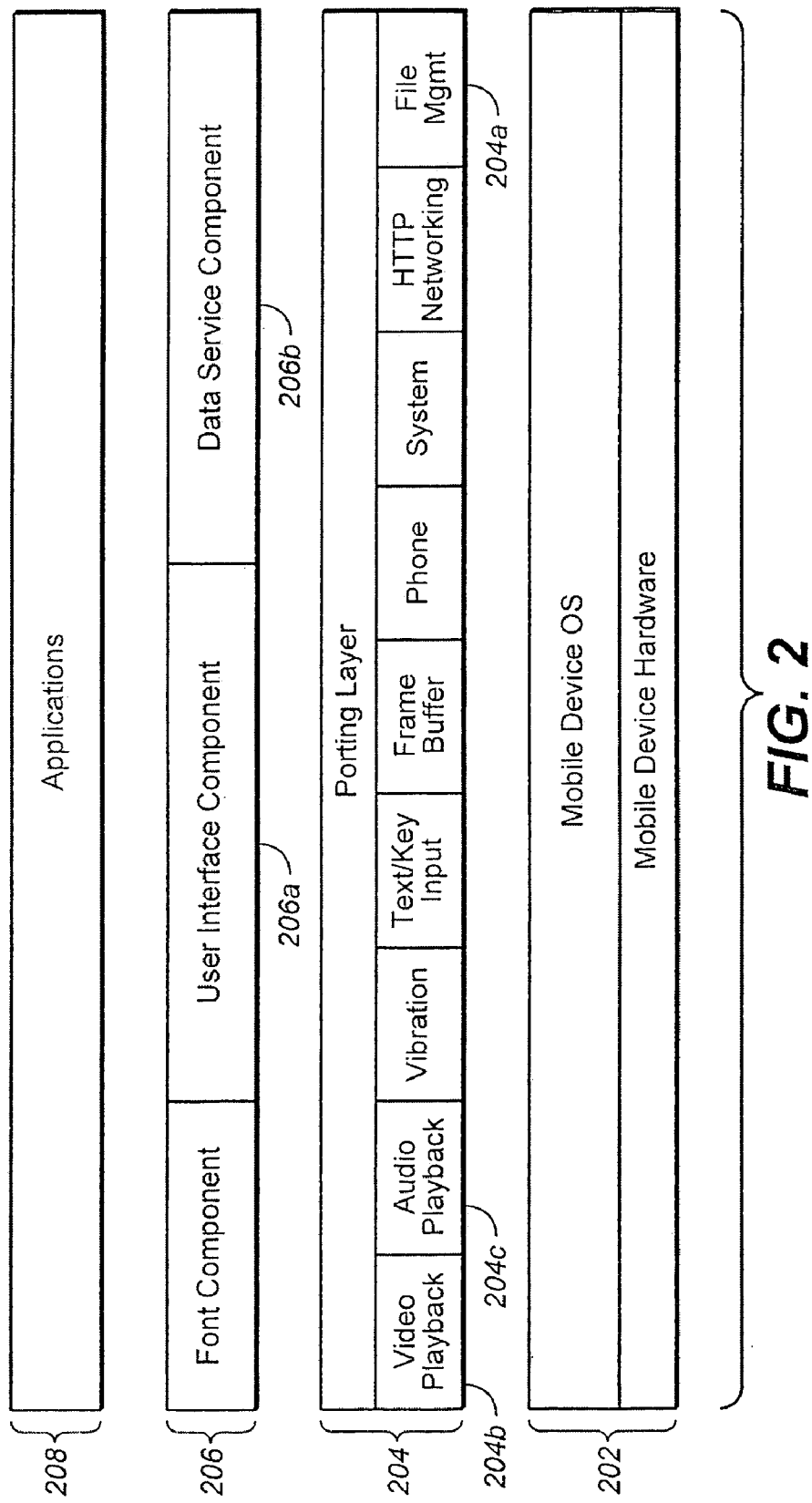
FIG. 2 is an example software architecture for playing content on a portable device.

FIG. 2 is an example software architecture for playing content on a portable device 110. The device hardware and operating system reside at the lowest level, device platform layer 202. The display, speakers, memory, processors, and other hardware may reside at this level. A hardware decoder may also be present in the device platform layer 202. An operating system may interact with the hardware by transmitting and receiving data and commands. The manufacture of a device may provide the components in the device platform layer 202. At porting layer 204, a set of APIs may be used to communicate with the device platform. Each API may include one or more methods that provide specific functionality. For example, a file management API 204a may provide methods for creating, reading, and deleting files that reside in memory. The porting layer 204 may provide an abstraction from the specifics of each device. That is, the layers above the porting layer 204 may be implemented without knowing the implementation details of each device 110. At the core services layer 206, many modules may be logically divided into sets of components, such as the user interface core 206a and the data service core 206b. The user interface core 206a may handle user interface interactions and content display. It may also implement modules that facilitate playback of content. The data service core may handle connections between the device 110 and a server 120, as well as local data storage in the file store 154. The application layer 208 may be the highest level of the architecture. At this level, applications may be written that use several of the modules of the core services layer 206 to create an application that would be useful to a user. A standalone content player, such as the content player 112, may reside in the application layer 208, but much of the functionality of the modules within the content player 112 may reside in the core services layer 206. For example, the rendering engine 148 may be one module that is partially or wholly implemented within the user interface core 206a.

In operation, an application, such as content player 112 may be executed on device 110. The content player 112 may begin playing a content file using the data service core 206b. The data service core 206b may utilize a method in the file management API 204a to read the content file that may be stored in memory in the device platform layer 202. The content player 112 may direct the data contained in the rich media file to the modules in the user interface component 206a to be played using the video playback 204b and audio playback 204c APIs in porting layer 204. These modules may further utilize components within the device platform to communicate the data in the content file through the display or the speakers of the device 110.

Figure 3:
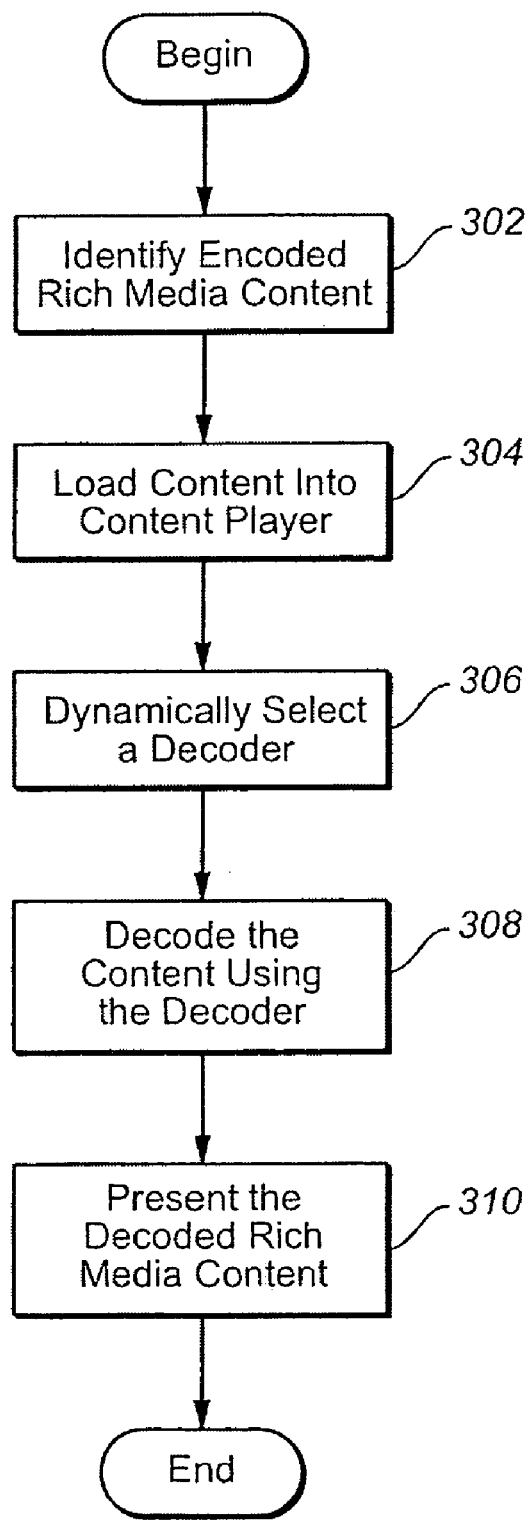
FIG. 3 is a flowchart describing an example method for dynamic playback of content on a portable device.

FIG. 3 is a flowchart describing an example method for playback of content on a portable device. At step 302, content that is to be presented is identified. The content may originate from a variety of sources. For example, the content may have been downloaded previously and thus may be stored locally awaiting playback. The content may be stored in an automatically synchronizing data store, which receives the content from a computing device that is connected to a network. The computing device may transmit the data over a local, personal, wide, or other area network, or may be transmitted over a direct data connection, such as, for example, an IEEE 1394, a Universal Serial Bus (USB) or other serial connection. The data store may receive updates based on frequencies that are associated with the content. The content may be streamed over an HTTP or RTMP connection from a remote server communicated with over the Internet. The content may be embedded in a script file, such as an SWF file. Once the content is identified, at step 304, the content may be loaded into a content player. The content player may also be involved in identifying the content at step 302. In encountering encoded content at run-time, the system may dynamically select or identify a decoder at step 306. The decoder may be an audio, video, or other decoder depending on the content. The decoder may also be a local hardware/software decoder native to the device itself or a software decoder provided by a third party and/or included in the content player. The content player may be configured to download dynamically from a feed server one or more components, including a decoder. At step 308, the previously selected or identified decoder facilitates the decoding of the content, which is presented at step 310.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, a local decoder may be identified by first identifying the portable device type—i.e., the make, model, software version, etc. The type of portable device may be determined using an API implemented on the portable device or determined from information supplied by a user. Based on the portable device type, a pre-configured mapping may be used to determine which decoder should be used for the particular make and model of a portable device. The mapping may be compiled into software used in a content player, may be transmitted over a network, or may be stored locally in a portable device. Decoders for content other than audio and video are contemplated, such as image decoders and text decoders (e.g., those that perform decryption). Also, missing components in a content player may be downloaded from a feed server at run time. These example implementations and other implementations are within the scope of the following claims.

What is claimed is:
1. A computer-implemented method comprising:
    identifying content to be presented wherein the content is stored in an automatically synchronizing data store of a portable computing device, the data store receiving the content across one or more networks;

loading the content into a content player defined by a set of computer-readable instructions stored on the portable computing device, wherein the content player identifies a local decoder operable to decode a portion of the identified content by:

determining if the portable computing device includes a device decoder distinct from the content player on the portable computing device; and selecting, as the local decoder, between a device decoder included on the portable computing device and a content player decoder included as part of the content player;

providing the portion of the identified content to the local decoder during playback of the identified content; and presenting the identified content using one or more user interfaces of the portable computing device.

2. The method of claim 1, wherein the device decoder is provided in a platform of a portable device.

3. The method of claim 1, wherein the content comprises audio content and the local decoder comprises an audio decoder.

4. The method of claim 1, wherein the content comprises video content and the local decoder comprises a video decoder.

5. The method of claim 1, wherein the set of computer-readable instructions defining the content player include a virtual machine.

6. The method of claim 5, wherein loading the content into the content player includes:

executing a file using the virtual machine, wherein the file includes the content; and sending the content to a content sourcing engine of the content player, the content sourcing engine operable to identify the local decoder.

7. The method of claim 1, wherein the content is associated with an update frequency.

8. The method of claim 7, wherein the data store updates based on the update frequency associated with the content.

9. The method of claim 1, further comprising:

providing a distinct second portion of the identified content to a distinct second decoder operable to decode the distinct second portion of the identified content while the local decoder is decoding the portion of the identified content; and presenting the distinct second portion of the content using one or more user interfaces of the portable computing device.

10. The method of claim 1, wherein the local decoder is identified by:

selecting between the device decoder and the content player decoder based on at least one of: playback quality, playback speed, licensing restrictions, manufacturer configuration, or user preferences.

11. A device comprising:

a data store operable to receive content automatically across a network;

a playback engine defined by a set of computer-readable instructions stored in a memory of the device, wherein the playback engine is communicatively coupled to the data store and is operable to:

determine that the device includes a device decoder distinct from a content player on the device;

select, as a local decoder, between the device decoder included on the device and a content player decoder included as part of the content player;

playback at least a portion of the content using the selected local decoder; and a porting layer, defined by a set of computer-readable interface instructions stored on the device, through which the playback engine is adapted to interface with the device decoder of the device for use in playback of at least a portion of the content.

12. The device of claim 11, further comprising and further operable to automatically update the content based on an update frequency associated with the content.

13. The device of claim 11, wherein the local decoder is included in a device platform of the device and separate from the playback engine, and wherein the playback engine interfaces with the device platform through the porting layer to identify the local decoder for decoding the content during playback.

14. The device of claim 11, further comprising a content player defined by a set of computer-readable instructions stored in the memory of the device, wherein the content player includes the playback engine.

15. The device of claim 11, wherein the content player comprises a virtual machine.

16. The device of claim 15, wherein the virtual machine is operable to send requests to decode the content to the playback engine, and the playback engine is operable to dynamically select the decoder.

17. A system comprising:

a network;

a server, communicatively coupled to the network, operable to transmit content through the network;

a portable device communicatively coupled to the network operable to:

automatically receive and synchronize the content;

load the content into a content player defined by a set of computer-readable instructions, where the content player is configured to dynamically select a local decoder operable to decode the content, the local decoder selected from a plurality of available decoders on the portable device, at least one of the available decoders included as part of the content player and at least one of the available decoders residing on the portable device separate from the content player;

provide the identified content to the local decoder during playback of the content; and present the decoded content on one or more user interfaces of the portable device.

18. The system of claim 17, wherein a platform of the portable device comprises the local decoder.

19. The system of claim 17, wherein the content comprises video content and the local decoder comprises a video decoder.

20. The system of claim 17, wherein the content player comprises a virtual machine.

21. The system of claim 20, wherein the content player further includes a playback engine, the virtual machine is operable to send requests to decode the content to the playback engine, and the playback engine dynamically selects the local decoder based at least in part on the content.

22. Software comprising instructions embodied in a computer-readable storage medium causing a data processing apparatus to perform operations comprising:

identifying content to be presented wherein the content is stored in an automatically synchronizing data store of a portable computing device, the data store receiving the content across one or more networks;

loading the content into a content player defined by a set of computer-readable instructions stored on the portable computing device, wherein the content player is configured to identify a local decoder operable to decode a portion of the identified content by:
  determining if the portable computing device includes a device decoder distinct from the content player on the portable computing device; and
  selecting, as the local decoder, between a device decoder included on the portable computing device and a content player decoder included as part of the content player;
providing the portion of the identified content to the local decoder during playback of the identified content; and
presenting the identified content using one or more user interfaces of the portable computing device.

23. The software of claim 22, wherein the data store updates based on an update frequency, the update frequency associated with the content.

24. The software of claim 22 causing the data processing apparatus to perform operations further comprising:
  providing a distinct second portion of the identified content to a distinct second decoder operable to decode the distinct second portion of the identified content while the local decoder is decoding the portion of the identified content; and
  presenting the distinct second portion of the content using one or more user interfaces of the portable computing device.

25. The software of claim 22, wherein the local decoder is identified by:
  selecting between the device decoder and the content player decoder based on at least one of: playback quality, playback speed, licensing restrictions, manufacturer configuration, or user preferences.

* * * * *